US008254966B2

(12) United States Patent
Carlson et al.

(10) Patent No.: US 8,254,966 B2
(45) Date of Patent: Aug. 28, 2012

(54) SYSTEM AND METHOD TO MODIFY WIRELESS NETWORK CALIBRATION DATA

(75) Inventors: John Carlson, Dulles, VA (US); Martin Alles, Vienna, VA (US); George Maher, Herndon, VA (US); Selcuk Mazlum, Leesburg, VA (US)

(73) Assignee: Andrew, LLC, Hickory, NC (US)

( * ) Notice: Subject to any disclaimer, the term of this patent is extended or adjusted under 35 U.S.C. 154(b) by 1241 days.

(21) Appl. No.: 12/026,352

(22) Filed: Feb. 5, 2008

(65) Prior Publication Data

US 2008/0214184 A1 Sep. 4, 2008

Related U.S. Application Data

(60) Provisional application No. 60/899,379, filed on Feb. 5, 2007.

(51) Int. Cl.
*H04W 24/00* (2009.01)
(52) U.S. Cl. ..................... 455/456.5; 455/425
(58) Field of Classification Search ............... 455/453, 455/456.5, 425, 456.1–456.6; 702/98, 94, 702/95; 340/539.13, 988, 989, 8.1; 342/357.2, 342/357.62
See application file for complete search history.

(56) References Cited

U.S. PATENT DOCUMENTS

| 3,150,372 A | 9/1964 | Groth, Jr. |
|---|---|---|
| 3,659,085 A | 4/1972 | Potter et al. |
| 4,814,751 A | 3/1989 | Hawkins |
| 4,845,504 A | 7/1989 | Roberts et al. |
| 4,891,650 A | 1/1990 | Sheffer |
| 5,056,106 A | 10/1991 | Wang |
| 5,218,618 A | 6/1993 | Sagey |
| 5,317,323 A | 5/1994 | Kennedy et al. |
| 5,327,144 A | 7/1994 | Stilp et al. |
| 5,365,544 A | 11/1994 | Schilling |
| 5,372,144 A | 12/1994 | Mortier et al. |
| 5,404,376 A | 4/1995 | Dent |
| 5,423,067 A | 6/1995 | Manabe |

(Continued)

FOREIGN PATENT DOCUMENTS

EP    1471688 A2    10/2004

(Continued)

OTHER PUBLICATIONS

Y. Zhao, "Standardization of Mobile Phone Positioning for 3G Systems," IEEE Communications Magazine, Jul. 2002, pp. 108-116.

(Continued)

*Primary Examiner* — Melody Mehrpour
*Assistant Examiner* — Emem Stephen
(74) *Attorney, Agent, or Firm* — Duane Morris, LLP

(57) ABSTRACT

A system and method to re-calibrate an area of a wireless communications network that has been exposed to one or more network configuration changes is disclosed. When one or more attributes of the wireless network undergo a change which impairs the geo-location capability to locate a mobile station, it can be detrimental to the safety and well being of the network users. Geo-location calculations rely on accurate and updated calibration data to correctly locate a mobile station. In some instances, it may be necessary to update the calibration data for areas of the network that have been exposed to network configuration changes. Modifying previously collected calibration data to account for changes that have occurred in the network may increase the accuracy of mobile station location estimation.

17 Claims, 6 Drawing Sheets

U.S. PATENT DOCUMENTS

| | | |
|---|---|---|
| 5,465,289 A | 11/1995 | Kennedy |
| 5,506,863 A | 4/1996 | Meidan et al. |
| 5,506,864 A | 4/1996 | Schilling |
| 5,508,708 A | 4/1996 | Ghosh et al. |
| 5,512,908 A | 4/1996 | Herrick |
| 5,515,419 A | 5/1996 | Sheffer |
| 5,519,760 A | 5/1996 | Borkowski et al. |
| 5,559,864 A | 9/1996 | Kennedy |
| 5,592,180 A | 1/1997 | Yokev et al. |
| 5,608,410 A | 3/1997 | Stilp et al. |
| 5,614,914 A | 3/1997 | Bolgiano et al. |
| 5,675,344 A | 10/1997 | Tong et al. |
| 5,736,964 A | 4/1998 | Ghosh et al. |
| 5,815,538 A | 9/1998 | Grell et al. |
| 5,825,887 A | 10/1998 | Lennen |
| 5,870,029 A | 2/1999 | Otto et al. |
| 5,920,278 A | 7/1999 | Tyler et al. |
| 5,945,948 A * | 8/1999 | Buford et al. .................. 342/457 |
| 5,952,969 A | 9/1999 | Hagerman et al. |
| 5,959,580 A | 9/1999 | Maloney et al. |
| 5,960,341 A | 9/1999 | LeBlanc et al. |
| 5,973,643 A | 10/1999 | Hawkes et al. |
| 5,987,329 A | 11/1999 | Yost |
| 6,014,102 A | 1/2000 | Mitzlaff et al. |
| 6,047,192 A | 4/2000 | Maloney et al. |
| 6,091,362 A | 7/2000 | Stilp et al. |
| 6,097,336 A | 8/2000 | Stilp |
| 6,097,959 A | 8/2000 | Yost |
| 6,101,178 A | 8/2000 | Beal |
| 6,108,555 A | 8/2000 | Maloney et al. |
| 6,115,599 A | 9/2000 | Stilp |
| 6,119,013 A | 9/2000 | Maloney et al. |
| 6,127,975 A | 10/2000 | Maloney |
| 6,144,711 A | 11/2000 | Raleigh et al. |
| 6,172,644 B1 | 1/2001 | Stilp |
| 6,184,829 B1 | 2/2001 | Stilp |
| 6,188,351 B1 | 2/2001 | Bloebaum |
| 6,191,738 B1 | 2/2001 | Pfeil et al. |
| 6,201,499 B1 | 3/2001 | Hawkes et al. |
| 6,201,803 B1 | 3/2001 | Munday et al. |
| 6,212,319 B1 | 4/2001 | Cayrefourcq |
| 6,233,459 B1 | 5/2001 | Sullivan et al. |
| 6,246,884 B1 | 6/2001 | Karmi et al. |
| 6,266,013 B1 | 7/2001 | Stilp et al. |
| 6,281,834 B1 | 8/2001 | Stilp |
| 6,285,321 B1 | 9/2001 | Stilp et al. |
| 6,288,675 B1 | 9/2001 | Maloney |
| 6,288,676 B1 | 9/2001 | Maloney |
| 6,295,455 B1 | 9/2001 | Fischer et al. |
| 6,311,043 B1 | 10/2001 | Haardt et al. |
| 6,317,081 B1 | 11/2001 | Stilp |
| 6,317,604 B1 | 11/2001 | Kovach, Jr. et al. |
| 6,334,059 B1 | 12/2001 | Stilp et al. |
| 6,351,235 B1 | 2/2002 | Stilp |
| 6,366,241 B2 | 4/2002 | Pack |
| 6,388,618 B1 | 5/2002 | Stilp et al. |
| 6,400,320 B1 | 6/2002 | Stilp et al. |
| 6,407,703 B1 | 6/2002 | Minter et al. |
| 6,463,290 B1 | 10/2002 | Stilp et al. |
| 6,470,195 B1 | 10/2002 | Meyer |
| 6,477,161 B1 | 11/2002 | Hudson |
| 6,483,460 B2 | 11/2002 | Stilp et al. |
| 6,492,944 B1 | 12/2002 | Stilp |
| 6,501,955 B1 | 12/2002 | Durrant et al. |
| 6,519,465 B2 | 2/2003 | Stilp et al. |
| 6,546,256 B1 | 4/2003 | Maloney |
| 6,553,322 B1 | 4/2003 | Ignagni |
| 6,563,460 B2 | 5/2003 | Stilp et al. |
| 6,571,082 B1 | 5/2003 | Rahman |
| 6,603,428 B2 | 8/2003 | Stilp |
| 6,603,761 B1 | 8/2003 | Wang |
| 6,640,106 B2 | 10/2003 | Gutowski et al. |
| 6,646,604 B2 | 11/2003 | Anderson |
| 6,661,379 B2 | 12/2003 | Stilp et al. |
| 6,765,531 B2 | 7/2004 | Anderson |
| 6,771,625 B1 | 8/2004 | Beal |
| 6,771,969 B1 | 8/2004 | Chinoy |
| 6,782,264 B2 | 8/2004 | Anderson |
| 6,834,234 B2 | 12/2004 | Scherzinger et al. |
| 6,839,539 B2 | 1/2005 | Durrant et al. |
| 6,845,240 B2 | 1/2005 | Carlson et al. |
| 6,859,172 B2 | 2/2005 | Powers et al. |
| 6,871,077 B2 | 3/2005 | Kennedy, Jr. |
| 6,873,290 B2 | 3/2005 | Anderson et al. |
| 6,876,859 B2 | 4/2005 | Anderson et al. |
| 6,920,329 B2 | 7/2005 | Kennedy, Jr. et al. |
| 6,922,170 B2 | 7/2005 | Alexander, Jr. |
| 6,952,158 B2 | 10/2005 | Kennedy, Jr. |
| 6,987,979 B2 | 1/2006 | Carlsson |
| 6,996,392 B2 | 2/2006 | Anderson |
| 7,023,383 B2 | 4/2006 | Stilp et al. |
| 7,167,713 B2 | 1/2007 | Anderson |
| 7,233,799 B2 * | 6/2007 | Spain, Jr. ................... 455/456.1 |
| 7,271,765 B2 | 9/2007 | Stilp et al. |
| 7,340,259 B2 | 3/2008 | Maloney |
| 7,359,718 B2 * | 4/2008 | Tao et al. ................... 455/456.5 |
| 7,427,952 B2 | 9/2008 | Bull et al. |
| 7,440,762 B2 | 10/2008 | Maloney et al. |
| 7,593,738 B2 | 9/2009 | Anderson |
| 7,636,061 B1 * | 12/2009 | Thomas et al. ............... 342/464 |
| 2002/0172223 A1 | 11/2002 | Stilp et al. |
| 2003/0064734 A1 | 4/2003 | Stilp et al. |
| 2003/0139188 A1 | 7/2003 | Chen et al. |
| 2003/0190919 A1 | 10/2003 | Niemenmaa |
| 2003/0203738 A1 | 10/2003 | Brown et al. |
| 2004/0043775 A1 | 3/2004 | Kennedy, Jr. et al. |
| 2004/0132466 A1 | 7/2004 | Kennedy, Jr. et al. |
| 2004/0203921 A1 | 10/2004 | Bromhead et al. |
| 2004/0218664 A1 | 11/2004 | Kennedy, Jr. et al. |
| 2004/0252752 A1 | 12/2004 | Kennedy, Jr. et al. |
| 2005/0040968 A1 | 2/2005 | Damarla et al. |
| 2005/0058182 A1 | 3/2005 | Kennedy, Jr. et al. |
| 2005/0078033 A1 | 4/2005 | Tamaki et al. |
| 2005/0136945 A1 | 6/2005 | Kennedy, Jr. et al. |
| 2005/0164712 A1 | 7/2005 | Kennedy, Jr. et al. |
| 2005/0176442 A1 | 8/2005 | Ju et al. |
| 2005/0192026 A1 | 9/2005 | Carlson et al. |
| 2005/0243936 A1 * | 11/2005 | Agrawala et al. ............. 375/259 |
| 2005/0266855 A1 | 12/2005 | Zeng et al. |
| 2006/0003695 A1 | 1/2006 | Kennedy, Jr. et al. |
| 2006/0003775 A1 | 1/2006 | Bull et al. |
| 2006/0030333 A1 | 2/2006 | Ward et al. |
| 2006/0116130 A1 | 6/2006 | Kennedy, Jr. et al. |
| 2006/0125695 A1 | 6/2006 | Kennedy, Jr. et al. |
| 2006/0141998 A1 | 6/2006 | Kennedy, Jr. et al. |
| 2006/0154607 A1 | 7/2006 | Kennedy, Jr. et al. |
| 2006/0240836 A1 | 10/2006 | Kennedy, Jr. et al. |
| 2006/0240843 A1 | 10/2006 | Spain et al. |
| 2007/0087689 A1 | 4/2007 | Kennedy, Jr. et al. |
| 2007/0111746 A1 | 5/2007 | Anderson et al. |
| 2007/0155401 A1 | 7/2007 | Ward et al. |
| 2007/0155489 A1 | 7/2007 | Beckley et al. |
| 2007/0202885 A1 | 8/2007 | Kennedy, Jr. et al. |
| 2008/0132244 A1 | 6/2008 | Anderson et al. |
| 2008/0132247 A1 | 6/2008 | Anderson et al. |
| 2008/0137524 A1 | 6/2008 | Anderson et al. |
| 2008/0158059 A1 | 7/2008 | Bull et al. |
| 2008/0160952 A1 | 7/2008 | Bull et al. |
| 2008/0160953 A1 | 7/2008 | Mia et al. |
| 2008/0161015 A1 | 7/2008 | Maloney et al. |
| 2008/0248811 A1 | 10/2008 | Maloney et al. |
| 2008/0261611 A1 | 10/2008 | Mia et al. |
| 2008/0261612 A1 | 10/2008 | Mia et al. |
| 2008/0261613 A1 | 10/2008 | Anderson et al. |
| 2008/0261614 A1 | 10/2008 | Mia et al. |
| 2009/0005061 A1 | 1/2009 | Ward et al. |

FOREIGN PATENT DOCUMENTS

| | | |
|---|---|---|
| JP | 06-347529 | 12/1994 |
| WO | 0034799 A1 | 6/2000 |
| WO | 02/082832 A2 | 10/2002 |
| WO | 2006088472 A1 | 8/2006 |

OTHER PUBLICATIONS

C. Drane, M. MacNaughtan, and C. Scott, "Positioning GSM Telephones," IEEE Communications Magazine, Apr. 1998, pp. 46-54, 59.

J. Caffery, Jr., and G. Stuber, "Overview of Radiolocation in CDMA Cellular Systems," IEEE Communications Magazine, Apr. 1998, pp. 38-45.

T. Rappaport, J.H. Reed and B.D. Woerner, "Position Location Using Wireless Communications on Highways of the Future," IEEE Communications Magazine, Oct. 1996, pp. 33-41.

I. Ziskind and M. Wax, "Maximum Likelihood Localization of Multiple Sources by Alternating Projection," IEEE Transactions on Acoustics, Speech, and Signal Porcessing, vol. 36, No. 10, pp. 1553-1560, Oct. 1988.

G.W.K. Colman, "A Comparison of the Accuracy of TDOA and TOA Location Algorithms with Equivalent Receiver Geometry," Defence R&D Canada Technical Memorandum (DREO TM 2001-063), Oct. 2001, pp. 1-53.

L. Mailaender, "On the Geolocation Bounds for Round-Trip Time-of-Arrival and All Non-Line-of-Sight Channels", EURASIP Journal on Advances in Signal Processing, vol. 2008, pp. 1-10.

N. Agarwal, L. Chaudran-Wadi, and V. Apte, "Capacity Analysis of the GSM Short Message Service", Indian Institute of Technology Bombay, www.cse.iitb.ac.In/~varsha/allpapers/wirelessincc03cam.pdf, 2004, pp. 1-5.

J.D. Bard, and F.M. Ham, "Time Difference of Arrival Dilution of Precision and Applications," IEEE Transactions on Signal Processing, vol. 47, No. 2, pp. 521-523, Feb. 1999.

K.C. Ho, and W. Xu, "An Accurate Algebraic Solution for Moving Source Location Using TDOA and FDOA Measurements", IEEE Transactions on Signal Processing, vol. 52, No. 9, Sep. 2004, pp. 2453-2463.

C.H. Knapp and G.C. Carter, "The Generalized Correlation Method for Estimation of Time Delay," IEEE Transactions on Acoustics, Speech, and Signal Processing, vol. ASSP-24, No. 4, Aug. 1976, pp. 320-327.

M. Rahnema, "Overview of the GSM System and Protocol Architecture," IEEE Communications Magazine, Apr. 1993, pp. 92-100.

S. Stein, "Algorithms for Ambiguity Function Processing," IEEE Transactions on Acoustics, Speech, and Signal Processing, vol. ASSP-29, No. 3, Jun. 1981, pp. 588-599.

M. Vanderveen, C.B. Papadias, and A. Paulraj, "Joint Angle and Delay Estimation (JADE) for Multipath Signals Arriving at an Antenna Array", IEEE Communications Letters, vol. 1, No. 1, Jan. 1997, pp. 12-14.

M. Wax and I. Ziskind, "On Unique Localization of Multiple Sources by Passive Sensor Arrays," IEEE Transactions on Acoustics, Speech, and Signal Processing, vol. 37, No. 7, Jul. 1989, pp. 996-1000.

B. Yang, "Projection Approximation Subspace Tracking," IEEE Transactions on Signal Processing, vol. 43, No. 1, Jan. 1995, pp. 95-107.

Amir Leshem, Mati Wax, "Array Calibration in the Presence of Multipath," IEEE Transactions on Signal Processing, vol. 48, No. 1, pp. 53-59, Jan. 2000.

Xin Wang, Zongxin Wang and Bob O'Dea, "A TOA-Based Location Algorithm Reducing the Errors Due to Non-Line-of-Sight (NLOS) Propagation," IEEE Trans. Vehicular Technology, vol. 52, No. 1, Jan. 2003, pp. 112-116.

M. Vanderveen, C. Papadias, A. Paulraj, "Joint Angle and Delay Estimation (JADE) for Multipath Signals Arriving at an Antenna Array," IEEE Communications Letters, vol. 1, No. 1, Jan. 1997, pp. 12-14.

R. Schmidt, "Multiple Emitter Location and Signal Parameter Estimation," IEEE Transactions on Antennas and Propagation, vol. AP-34, No. 3, Mar. 1986, pp. 276-280.

Y. Chen, M. Zoltowski, "Joint Angle and Delay Estimation for DS-CDMA with Application to Reduced Dimension Space-Time Rake Receivers," Mar. 1999, pp. 2933-2936.

A.J. Paulraj, C.B. Papadias, "Space-Time Processing for Wireless Communications", IEEE Signal Processing Magazine, vol. 11, Nov. 1997, pp. 49-83.

C.B. Papadias, A.J. Paulraj , "Space-Time Signal Processing for Wireless Communications: A Survey", Information Systems Laboratory, Stanford University.

M. Haardt, C. Brunner, J. Nossek, "Joint Estimation of 2-D Arrival Angles, Propagation Delays, and Doppler Frequencies in Wireless Communications," Proc. IEEE Digital Signal Processing Workshop, vol. 1, pp. 1-4, Bryce Canyon National Park, Utah, Aug. 1998.

Mati Wax, "Position Location from Sensors with Position Uncertainty," IEEE Transactions Aerospace and Electronic Systems, vol. AES-19, No. 5, Sep. 1983, pp. 658-662.

D.J. Torrieri, "Statistical Theory of Passive Location Systems", IEEE Transactions Aerospace and Electronic Systems, vol. AES-20, No. 2, Mar. 1984, pp. 183-198.

Y.T. Chan and K.C. Ho, "A Simple and Efficient Estimator for Hyperbolic Location", IEEE Transactions Signal Processing, vol. 42, No. 8, Aug. 1994, pp. 1905-1915.

W.H. Foy, "Position-Location Solutions by Taylor-Series Estimation", IEEE Transactions Aerospace and Electronic Systems, vol. AES-12, No. 2, Mar. 1976, pp. 187-194.

R.G. Stansfield, "Statistical Theory of DF Fixing", Journal IEE 94, Part III A, Oct. 1947, pp. 762-770.

M.P. Wylie and J. Holtzman, "The Non-Line of Sight Problem in Mobile Location Estimation", Process IEEE 5th International Conference on Universal Personal Communications, vol. 2, Oct. 1996, pp. 827-831.

L.Cong and W. Zhuang, "Non-Line-of-Sight Error Mitigation in TDOA Mobile Location", Process IEEE Global Telecommunications Conference, vol. 1, Sep. 2001, pp. 680-684.

P.C. Chen, "A Non-Line-of-Sight Error Mitigation Algorithm in Location Estimation", Process IEEE Conference on Wireless Communications Networking, vol. 1, 1999, pp. 316-320.

N.J. Thomas, D.G.M. Cruickshank and D.I. Laurenson, "Performance of a TDOA-AOA Hybrid Mobile Location System", 3G Mobile Communication Technologies, Conference Publication No. 477, Mar. 2001, pp. 216-220.

J. Caffery, Jr., and G. Stuber, "Subscriber Location in CDMA Cellular Networks," IEEE Transactions on Vehicular Technology, vol. 47, No. 2, May 1998, pp. 406-416.

J. Caffery. Jr., "A New Approach to the Geometry of TOA Location," IEEE, VTC 2000, pp. 1943-1949.

M.Silventoinen and T. Rantalainen, "Mobile Station Emergency Locating in GSM", Process IEEE International Conference, Personal Wireless Communications, vol. 1, 1996, pp. 232-238.

\* cited by examiner

SYSTEM AND METHOD TO MODIFY WIRELESS NETWORK CALIBRATION DATA

CROSS REFERENCES

The present application is related to Provisional Application No. 60/899,379 entitled "Mobile Location Using Network Measurement Reports" filed on Feb. 5, 2007, which is hereby incorporated by reference in its entirety.

BACKGROUND

The use of wireless communication devices such as telephones, pagers, personal digital assistants, laptop computers, etc., hereinafter referred to collectively as "mobile appliances" or "mobiles stations" has become prevalent in today's society. In recent years, at the urging of public safety groups, there has been increased interest in technology which can determine the geographic position or "geo-locate" a mobile station in certain circumstances. The success of locating a mobile station depends on the availability of accurate calibration data representing the geographical region of the wireless network.

A wireless network is subject to various adjustments and changes over time. Even though some of those changes may not occur frequently, it is possible that certain components are adjusted, installed or removed on a daily basis. For example, in certain areas of the network, the peak wireless data traffic may only occur during a particular part of the day (i.e., a shopping mall between the hours of 10:00 am and 8:00 pm), and one or more components of the wireless network may be adapted during that time to handle such traffic. At other times, it may be that there is less wireless data traffic in a particular area (i.e., a shopping mall between the hours of midnight and 8:00 am), so during such times it may be more efficient to allocate those system resources elsewhere (i.e., moving the antenna coverage away from the mall during closure periods).

In general, the wireless network configuration may be considered a dynamic entity. It may be necessary to distinguish between anticipated changes that are known to the network operator and/or the location system operator, and changes that are sudden and/or unanticipated such as an immediate network related change (i.e., a particular sector change or failure etc.). A predetermined procedure may be installed to make adjustments for those anticipated changes that are known to occur on a scheduled basis, however, a different approach may be necessary for sudden or unanticipated occurrences.

When some aspect of the network changes which impairs the geo-location capability, it may be detrimental to the safety and well being of the network users. It is important that the geo-location finder system functions continuously with minimum degradation. Geo-location estimate calculations rely on accurate and updated calibration data to correctly locate a mobile station. In some instances, it may be necessary to perform re-calibration on areas of the network that have been exposed to network configuration changes.

Re-calibration efforts can often be burdensome, time consuming and expensive. Further, the network configuration may have only changed in one particular area, thus making an entire re-calibration process redundant. Modifying the previously collected calibration data to account for changes that have occurred in the network may increase the accuracy of estimating the mobile station location. Additionally, modifications to pre-existing calibration data may reduce time and costs otherwise necessary to maintain updated calibration data.

One embodiment of the present subject matter is a method to modify wireless network calibration data by comparing a first set of calibration data to a second set of data, the first set of calibration data representing measured signal power obtained at a plurality of locations in communication range of the geographical area of the wireless network, the second set of data representing prediction signal power obtained via a computational device where the prediction signal power may not be based on the values of the measured power signals. The method may further determine at least one function to represent at least one difference between the actual measured power signals and the prediction power signals, and modify one or more values of the first set of calibration data based on the at least one function.

Another embodiment of the present subject matter is a method to modify wireless network calibration data by detecting at least one of an increase and a decrease in the amount of data traffic within a coverage area of at least one base station in the wireless network and adding or subtracting at least one traffic channel to accommodate the change in data traffic. The method may further modify one or more values of the wireless network calibration data to reflect the change in the number of traffic channels by replacing the one or more values of the wireless network calibration data via prediction calibration data that is obtained via a computing device, and which is computed independent of the values of the wireless network calibration data.

Yet another embodiment of the present subject matter is a method to modify wireless network calibration data by comparing a first set of calibration data to a second set of data, the first set of calibration data representing at least the actual measured power signal levels of a signal power of a serving base station and a signal power of at least one neighboring base station, where the power signal levels were obtained at one or more location points in communication range of the geographical area of the wireless network. The second set of calibration data may represent prediction power signals obtained via a computational device where the prediction signal power may not be based on the values of the actual measured power signals. The method may further determine at least one function to represent at least one difference between the actual measured signal power and the prediction power signals and modify at least one value of the first set of calibration data based on the at least one function, where the modified at least one value includes changing the power level of the at least one neighboring base station. The method may also compare the signal power level of the serving base station to the signal power level of the modified at least one neighboring base station. If the modified neighboring base station has a higher signal power level at a particular location point than the signal power level of the serving base station at that same location point, then the method may change the status of the neighboring base station by designating the neighboring base station as a new serving base station and designating the previously recognized serving base station as a neighboring base station.

Yet still another embodiment of the present subject matter is a method to modify wireless network calibration data by determining a power level change in signals transmitted and/or received by one or more base stations communicating within a predefined region and identifying at least a portion of the predefined region that may be affected by the power level change, examining a collection of calibration data parameters to determine which data parameters represent location points within the portion of the predefined region affected by the power level change. The method may further modify the data parameters within the portion of the predefined region affected by the power level change based on the value of the power level change.

These and other advantages of the disclosed subject matter over the prior art will be readily apparent to one skilled in the art to which the disclosure pertains from a perusal of the claims, the appended drawings, and the following detailed description of the preferred embodiments.

DETAILED DESCRIPTION

Anticipating changes in the wireless network may require modifications to the known calibration data collected over a particular region. Methods of modifying calibration data using various techniques are described herein.

Figure 1:
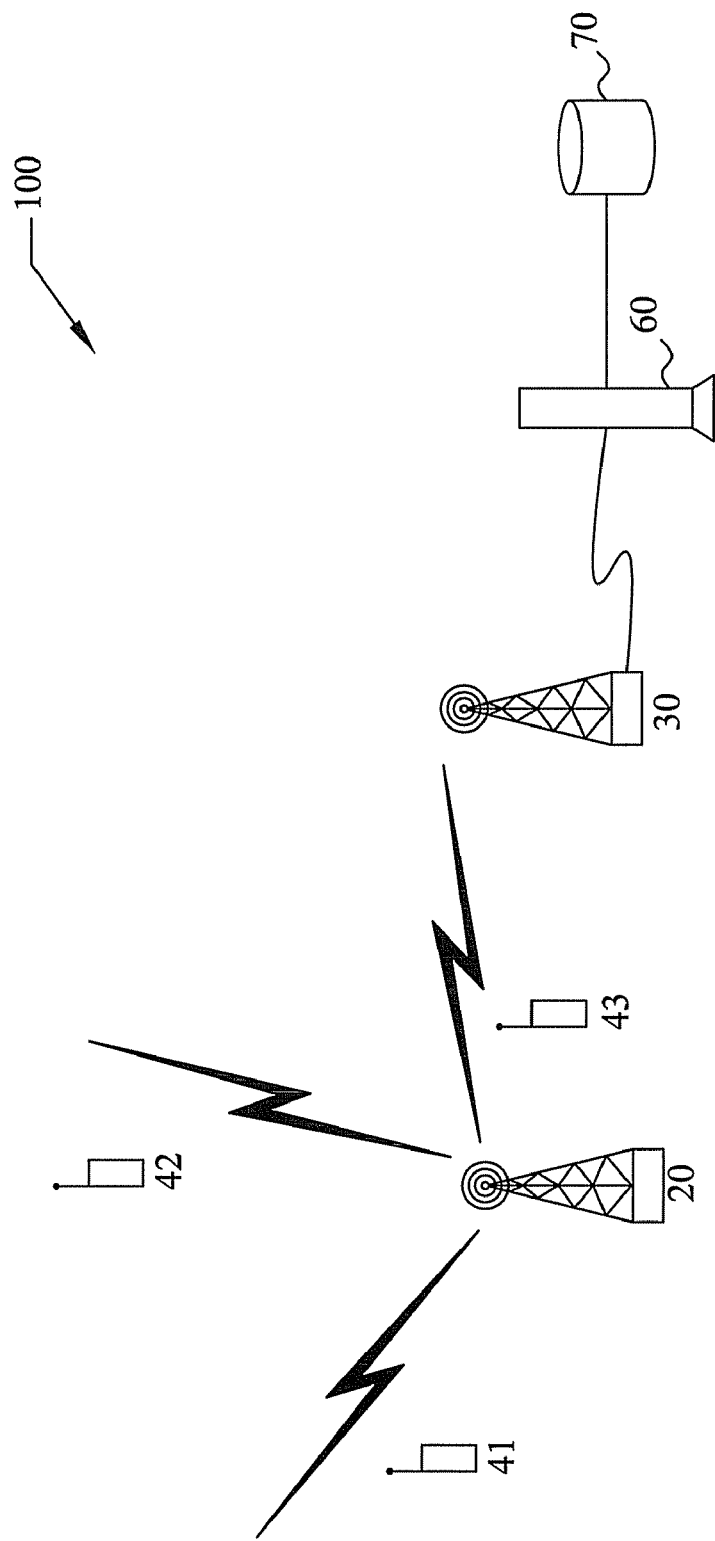
FIG. 1 illustrates a wireless communications network and calibration data management system.

FIG. 1 illustrates a wireless communications network 100 including base stations 20 and 30, mobile stations 41-43, a server terminal 60 coupled to a base station 30, and a calibration database 70 coupled to the server terminal 60.

The network configuration 100 illustrated in FIG. 1 may represent a snapshot of the current configuration of the network at a particular moment in time. Various changes, such as, an increase/decrease in the number of mobile stations or available data channels may occur at predetermined scheduled intervals or unexpectedly due to rapid changes in the network configuration. For example, a scheduled increase in user capacity may be anticipated for a mobile network covering a shopping plaza that opens at the same time everyday. In such a case, the number of data channels allocated by the base station(s) may be increased on a scheduled basis in anticipation of the daily opening of the shopping plaza.

The calibration data may be based on the network configuration data, and may be stored in the calibration database 70. Alternatively, the calibration data may be based on other computational representations of the stored calibration data. Modifying the existing calibration data may be necessary to maintain updated data such that the data is valid for making appropriate changes to the network configuration and/or for the purpose of geo-locating a mobile station.

Network configuration data used to perform changes to the network may be shared via a communication link between a location system operator and the network operator. The changes that are known to occur, such as, operating hours of a shopping plaza requiring increased data capacity, may be anticipated by the location system operator and the network operator and planned for accordingly. Contrary to known changes, there are unexpected changes such as, base station sector antenna failure that may be unknown to the location system operator and/or the network operator.

An antenna failure or other form of unexpected network change may require re-calibration before the calibration data is again an accurate depiction of the current network conditions. If the network operator discovers an antenna failure that is commonly relied on by the location operator to perform geo-location operations, then the updated information must be communicated between the operators before an accurate geo-location operation may be performed in that particular area.

Changes in the network will often require a re-calibration process before a location operator can accurately perform a geo-location operation. When a failure occurs, the amount of time required to perform a re-calibration procedure may be related to the down time of the geo-location capability.

Modifying the existing calibration data stored in the calibration database 70 without performing physical re-calibration procedures, (i.e., field calibration) may save a considerable amount of time and resources. Some examples of network changes that may require re-calibration include: antenna configuration, serving cell/sector reassignment, increase/decrease in the number of channel assignment etc. Those and other types of network configuration changes may be necessary to accommodate the dynamic nature of the network, however, the changes may require re-calibration of the areas affected by such changes.

Modifying the configuration of one more antennas at a cell/sector of a base station may be necessary to maintain or modify the existing coverage of the network. Additionally, adjusting the power levels and/or frequency allocations of one or more antennas at their respective locations may be a necessary form of routine maintenance, system upgrade or scheduled alteration.

A cell/sector neighboring cell base station (NC) RF map may be used as a reference of the power levels at each calibration point corresponding to a particular transmit power at a sector wireless antenna. The RF map may be represented as a list or table of power levels or other information, and may be stored in memory. The RF map may provide the relative power levels at each calibration point when a particular antenna of a particular cell/sector was used.

The RF map information may be derived from existing calibration data. In addition, an RF map may also be obtained by using an RF planning tool, where various attributes of the operating environment are collected and inputted into a software program which predicts and/or estimates the RF signal power levels at various points in the network. The relationship between the RF map derived from the calibration data and the RF map derived from the RF planning tool may provide an increased level of accuracy when making adjustments to the network.

The relationship between the calibration data RF map and the planning tool RF map may be represented as a set of scalars each applicable to a particular calibration point. Establishing a relationship between the calibration data RF map and the planning tool RF map may provide a way to estimate changes that occur during a subsequent antenna modification. If, for example, the antennas have changed (e.g., direction, power level, pattern) it is possible to establish the relationship of the antenna patterns using the RF planning tool and then implement this relationship with the computed scalar set to estimated the expected RF signal power resulting from the antenna change. As a result, the calibration data of the locations with range of the antenna may need to be modified to accommodate the recent changes.

Figure 2:
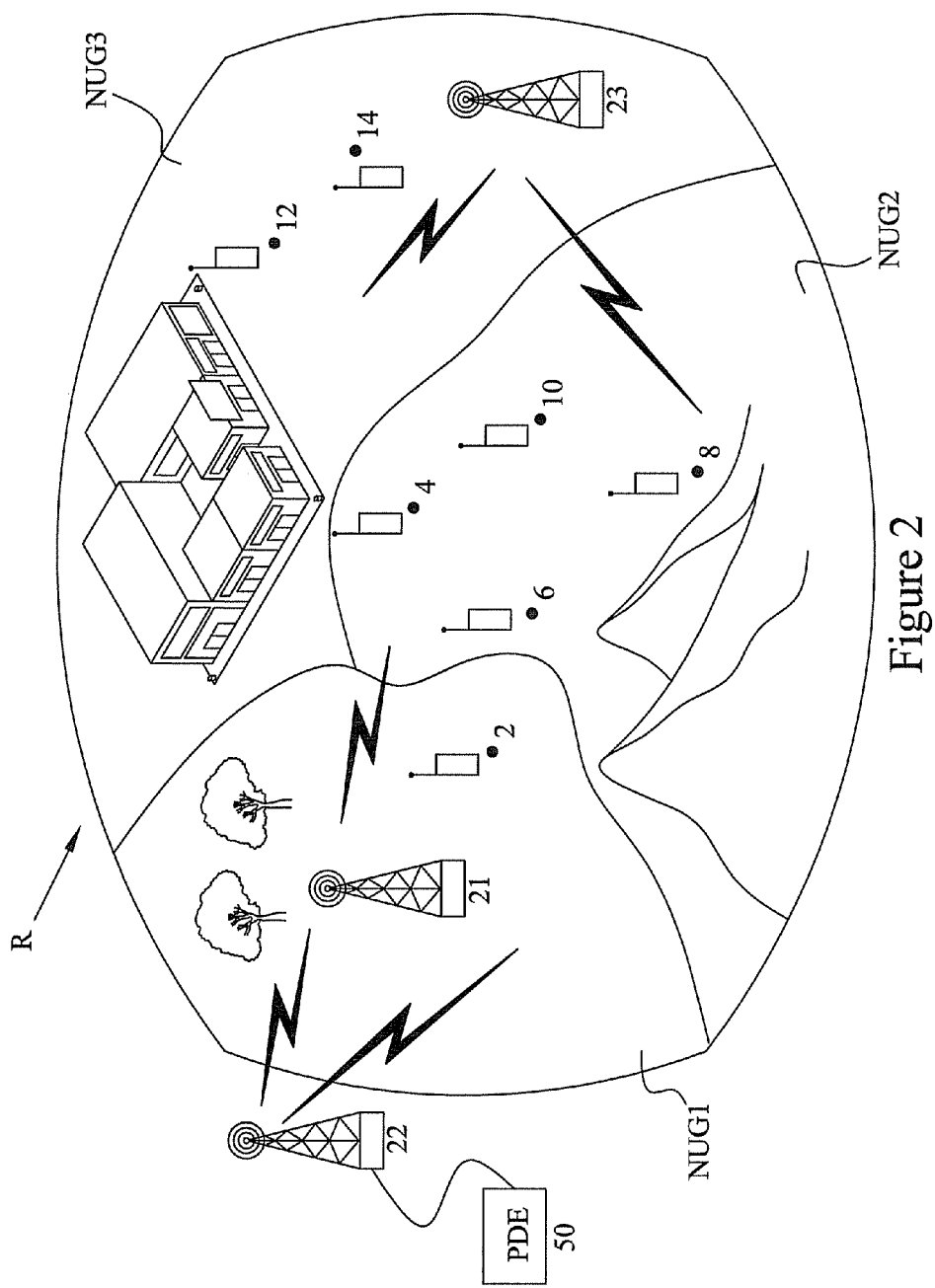
FIG. 2 illustrates a wireless communications networking environment.

Network measurement reports (NMRs) may be used to represent the calibration data at an estimated location and/or signal characteristics measured at the mobile station. A NMR data vector may contain measured signal power level parameters (e.g., P1, P2, P3) and/or a timing advance parameter TA1 and/or many other parameters or functions and such an example should not limit the scope of the claims appended herewith. An exemplary NMR data vector may be represented as NMR_data_vector [P1, P2, P3, TA1]. The NMR data vector may contain any amount or type of parameter, and may be generated by a mobile station or a calibration data collection device. The power values P1-P3 may correspond to the power level of signals measured for each base station 21-23 in a given region R, as illustrated in FIG. 2.

The value of the timing advance (TA) parameter corresponds to the length of time a signal from a MS takes to reach a particular BS. A MS may be configured to transmit data signals at specific timeslot intervals depending on the type of wireless communication protocol employed (e.g., TDMA, GSM, 3GPP etc.). Using the speed of light (c=3*10^m/s) as a reference velocity for the radio waves, the TA parameter may be increased or decreased depending on the distance between the MS and the BS. The TA parameter may be periodically adjusted as the distance from the MS to the BS changes.

Each calibration point may have an associated calibration data vector or NMR, and in each such data vector or NMR one particular element may refer to a NC signal power of a particular sector antenna. When the antenna undergoes a change, the pre-existing calibration points may be replaced with the newly computed values calculated, for example, by the RF planning tool map. In the extreme case of the antenna being powered down or removed, the corresponding values in all the respective calibration data vectors may be set to indicate the absence of a signal (e.g., low dBm NC signal power, removal of the NC signal etc.).

In another example, when a heading position of the antenna has changed, the relationship of the calibration data RF map may be compared to the planning tool RF map, taking into account the adjusted heading position, to determine the replacement values for the NC signal power levels in the calibration data vectors.

Alternatively, the pre-existing data vector values may be scaled to adjust for the new heading position in the two-dimensional region, and those adjusted values may be used to replace the calibration data vector values representing the location of the rotated position. Similarly, if the transmit power level of a sector is changed by X dB then the calibration data of the data vectors may be adjusted by X dB to reflect the change in power level.

Comparing the power level of the serving cell/sector to the power levels of the newly computed NCs at a particular calibration point may demonstrate a higher signal power at one or more of the NCs than at the current serving cell/sector. Assuming, for example, a new NC signal power level has been calculated at a particular calibration point, it is possible that the new NC signal power level is greater than the power level of the current serving cell/sector. A threshold value may be established to determine if the newly computed NC signal power exceeds the threshold value, and if so, then certain network parameters (i.e., designated serving cell/sector) may need to be modified.

In addition to the power levels at a given calibration point, other calibration data vectors parameters may be modified. One exemplary parameter may include the identified serving cell/sector, which may be set to a NC cell/sector that has a newly computed signal power level exceeding the threshold value over the power level of the current serving cell/sector. Another example may include a timing advance (TA) parameter, and/or similar parameters that are associated with the current serving cell/sector or which are affected by a change in the serving cell/sector and NC signals. Modifications to parameters may be calculated based on a newly assigned serving cell/sector. As a non-limiting example, the applicable TA parameter for the new serving cell/sector may be calculated based on the known locations of the calibration data point(s) and the new serving cell/sector.

A change in the amount of data traffic transmitted/received at a particular cell/sector may require additional channels. For example, variations in user density (i.e., a shopping mall shortly after opening) may require additional channels be added at a particular cell/sector that covers the mall area. When a new channel(s) is applied at a particular cell/sector, the RF signal power distribution at that particular cell/sector may be impacted depending on the frequency allocation of the assigned channel(s). The RF planning tool may be used to establish relationships between the pre-existing configuration prior to adding additional channels and the modified configuration where the frequency is modified. The power levels of the calibration data vectors must also be adjusted to accommodate the additional channel(s).

Changes in the network environment may require corresponding modifications to be made. Monitoring the network to determine when and what type of changes occur may require examination of the calibration data vector parameters to anticipate which vectors will be affected by the changes. Calibration data vectors available in the calibration database 50 may be accessed to determine whether a recent network change has an impact on the corresponding parameters. For example, if the NC cell/sector power level P1 may be contained in the calibration data vector sample data_vector_[P1, X,Y,Z], it is likely that this vector will be affected by a change at that particular NC.

Having identified the calibration data vectors impacted by a given network change, the locations of such vectors may be aggregated into a location set. The location set then constitutes a region that may be identified for re-calibration. In addition, when a cell/sector power level is increased, calibration data vectors that may have previously indicated the absence of this NC signal may now be activated. The calibration data vectors may contain dummy fields set to the lowest possible dBm value for every NC signal in its proximity. The dummy fields used to represent the NC signal power may then be incremented appropriately to reflect the changes which have occurred.

A non-uniform grid point (NUG) or uniform grid point (UG) may be generated to represent the signal characteristics and calibration data over a given region. FIG. 2 illustrates a geographical region (R) having NUGs represented by NUG1, NUG2 and NUG3. The NUGs represent an area of collected calibration data based on signals transmitted from the MSs identified within the geographical region of the NUG (e.g., (MS 2 and BS 21—NUG1), (MS 4, 6, 8 and 10—NUG2) and (MS 12, 14 and BS 23—NUG3)). BS 22 may serve one or more NUGs and may be located outside the region (R) of the identified NUGs. The different NUGs may be separated based on geographical considerations (e.g., mountains, buildings, roads) or varying concentrations of MSs.

Referring to FIG. 2, the NUGs illustrated in the example region R may also be reconfigured. The NUGs may or may not need to be recomputed as a result of a network change. Determining which NUGs need to be recomputed may be accomplished by viewing the corresponding calibration data. If, for example, any calibration data has experienced a change due to antenna changes, power modifications, additional channel assignments etc., then those NUGs containing such calibration data may be identified and then the algorithm used to modify the calibration data may be applied to all the calibration data within the identified NUGs. Additionally, NUGs may be further separated into sub-regions and the calibration modifications may be applied to only that sub-region. As a result, NUGs can be adjusted as a whole so that the modified NUG is valid for location purposes subsequent to the network change.

Identifying certain calibration data vectors and/or NUGs that have been affected by a network change may provide a screening mechanism that keeps a record of those affected areas, and applies a reduced confidence metric to those areas indicating a likelihood of failure for subsequent geo-location efforts. Until the affected areas are re-calibrated or modified to reflect the recent network changes, the affected areas may be scaled back by applying a reduced confidence metric. For example, the probabilities in the NUG probability density functions (pdfs) may be lowered, or, conversely, a distortion measure may be increased to account for a reduced confidence, and computed against such NUGs when performing a location estimate.

Another possibility is the selective deletion of affected parameters from consideration in the computations. In this case, if a particular parameter is affected, this parameter may be identified and deleted from the NUG and/or NMR generation process. The NUG or NMR would then be generated as if this parameter does not exist or is reduced to a minimum threshold, thus reducing its probability in a calculated pdf. The location system may then include such NUGs in subsequent location estimation tasks. In another alternative, the confidence characteristic for such NUGs may be set to zero and eliminated from consideration in those NUGs.

If the size of the affected regions encompass nearly the entire coverage areas of particular sectors or cells, the location system could be switched to a bypass mode to perform geo-location by using alternative location procedures, such as, cell-ID (CID) or enhanced cell-ID (E-CID) mode for these selected sectors or cells. E-CID locates a mobile station by relying on TA parameters and power measurements from the wireless network in addition to the location designated by the CID of the mobile station. It may be prudent to have a backup geo-location procedure, such as, CID or E-CID in place when the primary system is unavailable.

Figure 3:
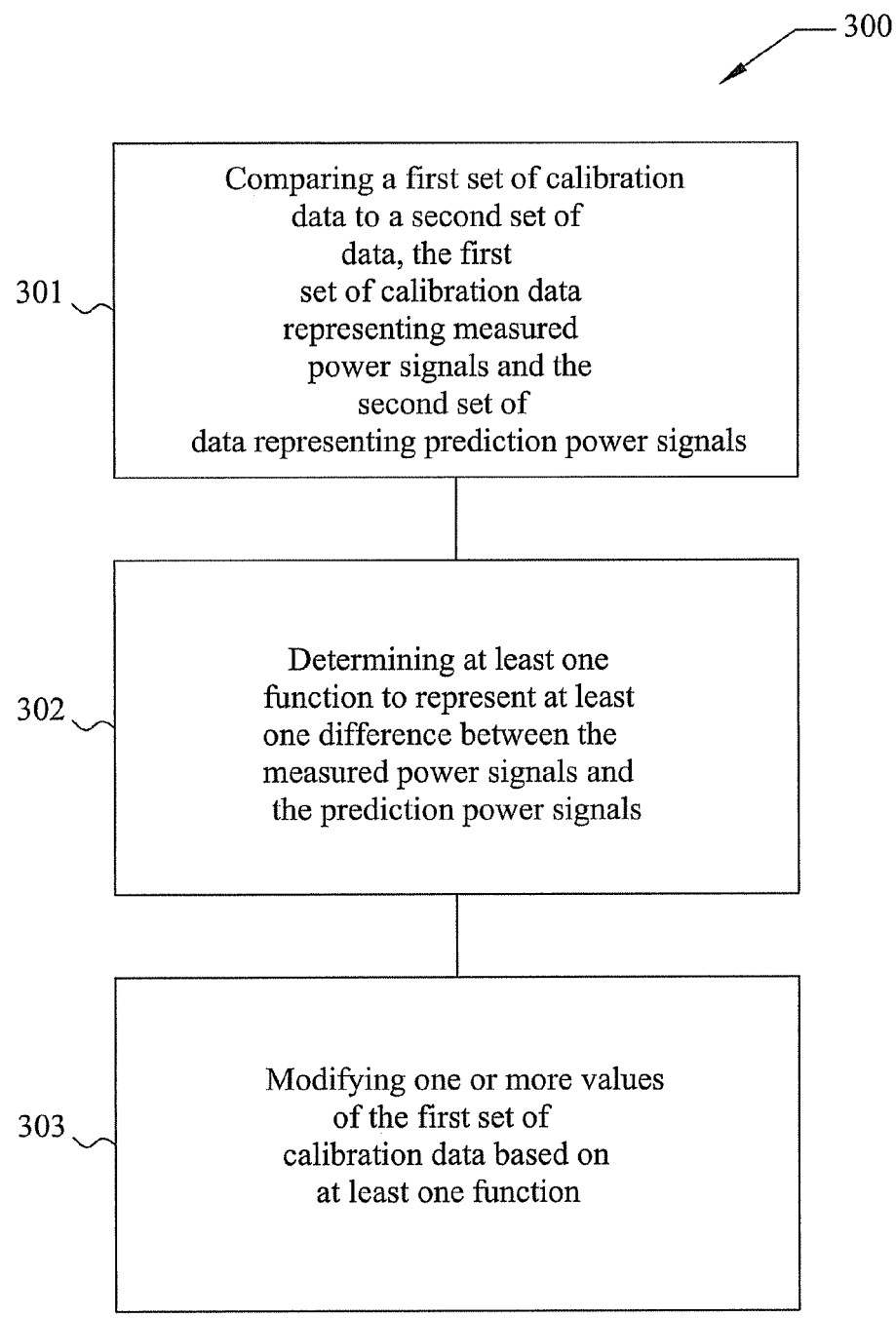
FIG. 3 illustrates a flow diagram according to an exemplary embodiment.

FIG. 3 illustrates a flow diagram 300 of an exemplary method of modifying the network calibration data. A first set of calibration data may be compared to a second set of data, where one set may be the measured calibration data and the other may be predicted data (operation 301). A difference(s) between the two data sets may be determined (operation 302). Then, the difference measured may be used to modify the calibration data (operation 303).

Figure 4:
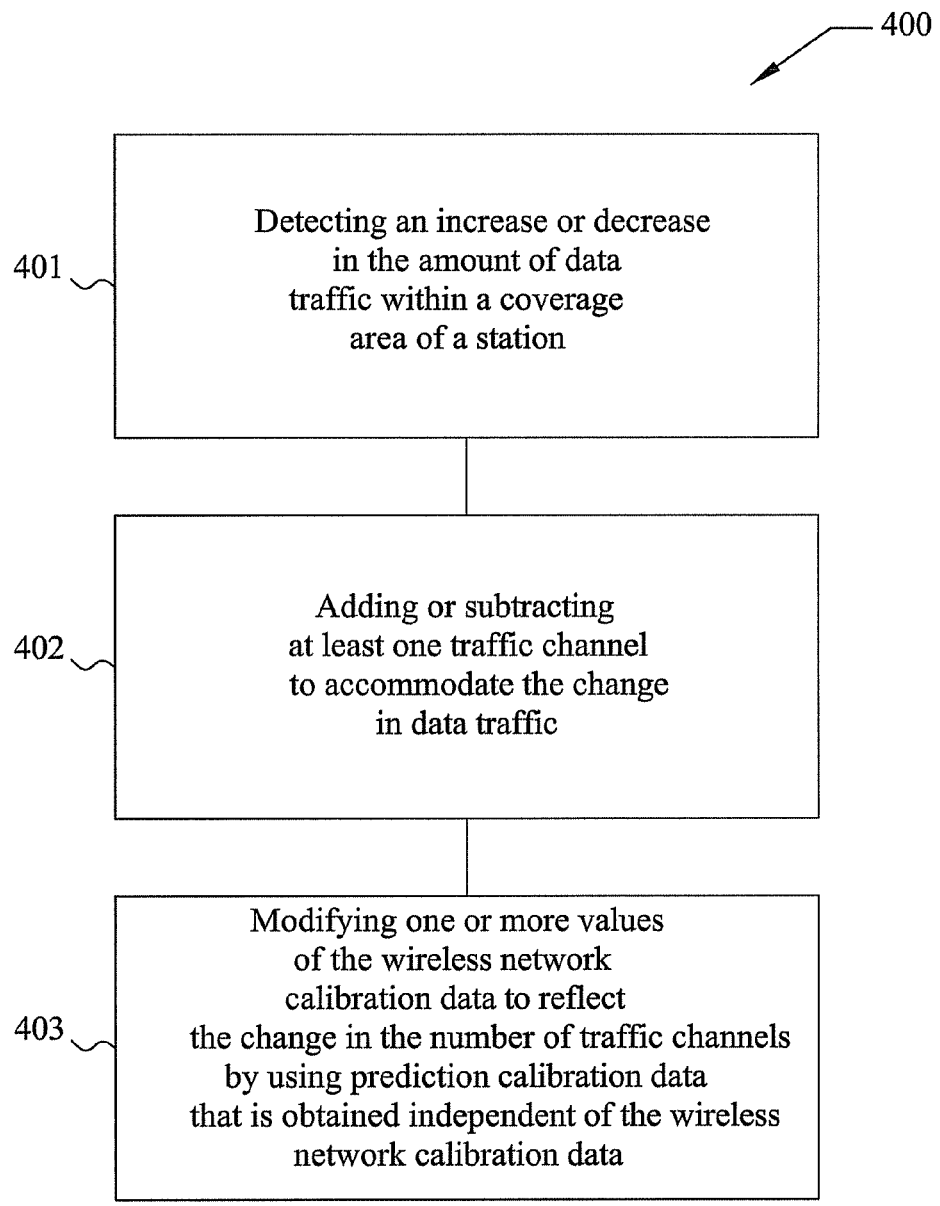
FIG. 4 illustrates a flow diagram according to another exemplary embodiment.

FIG. 4 illustrates a flow diagram 400 of an exemplary method of modifying the network calibration data. A change in the amount of data traffic may be detected (operation 401). A change in the number of data channels may be made to accommodate the change in data traffic (operation 402). Then, the calibration data may be modified to reflect the change in the number of data channels (operation 403).

Figure 5:
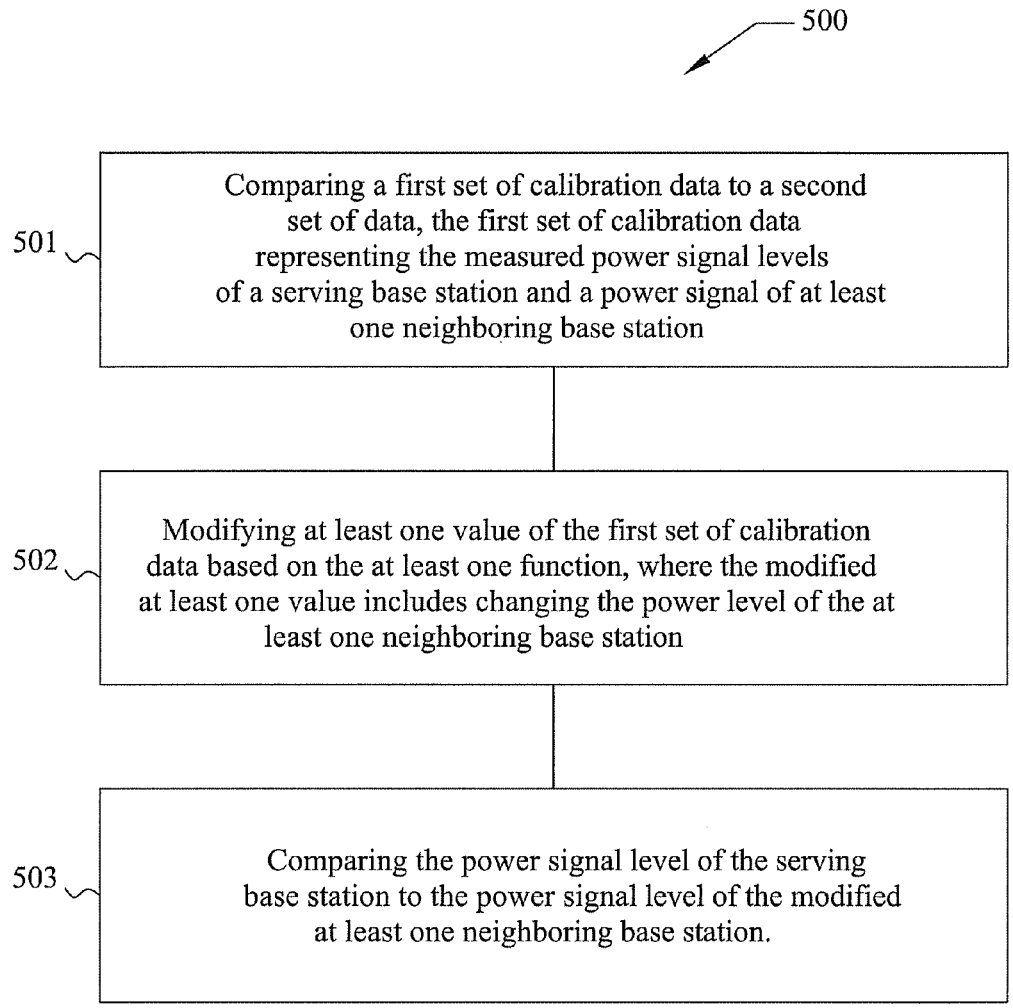
FIG. 5 illustrates a flow diagram according to yet another exemplary embodiment.

FIG. 5 illustrates a flow diagram 500 of an exemplary method of modifying the network calibration data. A first set of calibration data may be compared to a second set of calibration data (operation 501). The first set of calibration data may be then modified based on the comparison to include modifying the power level of a neighboring base station (operation 502). The power level of the serving base station may be compared to the power level of the modified neighboring base station to determine if a change in the designated serving base station may be needed (operation 503).

Figure 6:
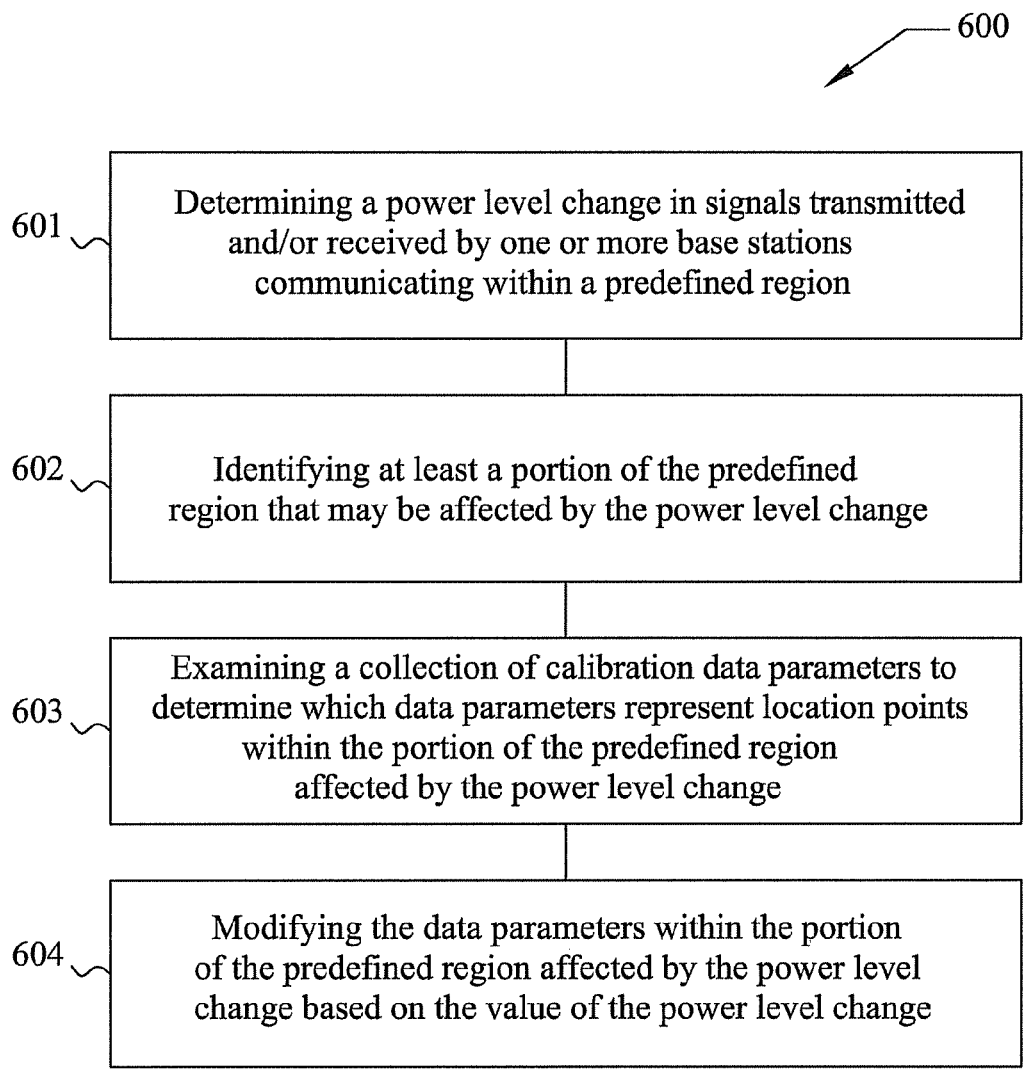
FIG. 6 illustrates a flow diagram according to yet still another exemplary embodiment.

FIG. 6 illustrates a flow diagram 600 of an exemplary method of modifying the network calibration data. A power level change of signals transmitted and/or received in a given region may be detected (operation 601). A portion of the predefined region affected by the power level change is identified (operation 602). The calibration data parameters affected by the power level change are identified (operation 603). The data parameters within the portion of the predefined region affected by the power level change are then modified to reflect the power level change (operation 604).

While preferred embodiments of the present invention have been described, it is to be understood that the embodiments described are illustrative only and the scope of the invention is to be defined solely by the appended claims when accorded a full range of equivalents, many variations and modifications naturally occurring to those skilled in the art from a perusal hereof.

What is claimed is:

1. A method of locating a mobile station, the method comprising:
   providing a first set of calibration data representing measured signal power is obtained at a plurality of locations in a geographical area of a wireless network;
   providing a second set of data representing predicted signal power;
   comparing the first set of calibration data to the second set of data;
   determining at least one function to represent at least one difference between the measured signal power and the predicted signal power; and
   modifying one or more values of the first set of calibration data based on the at least one function and using the modified first set of calibration data to locate a mobile station, wherein the calibration data representing the plurality of different locations of the geographical area are represented as a data vector containing a plurality of different power level values of a plurality of different neighboring cell stations, where at least one value of said data vector is a dummy value used to represent one of said plurality of neighboring cells, and where the dummy value is incremented to represent a change in power level of the corresponding neighboring cell represented by said dummy value.

2. The method of claim 1, wherein the measured signal power and the predicted signal power are based on relative power levels at the plurality of locations from one or more wireless transmission antennas.

3. The method of claim 1, wherein the functions represent a set of scalars each representing the difference in signal power between the first set of calibration data and the second set of data at individual calibration points in communication range of the geographical area of the wireless network.

4. The method of claim 2, wherein the comparing, determining and modifying operations are performed in response to a modification of one or more of the antennas.

5. The method of claim 4, wherein the modification of one or more of the antennas represents a change in antenna pattern.

6. The method of claim 4, wherein the modification of one or more of the antennas is detected automatically.

7. The method of claim 4, wherein each calibration point has an associated data vector representing at least one of the measured signal power and the predicted signal power of at least two neighboring base stations, and wherein at least two values of a data vector associated with a first calibration point are modified in response to a modification of one or more of the antennas.

8. The method of claim 4, wherein the modification includes a change in the heading position of one or more of the antennas.

9. A method of locating a mobile station, the method comprising:
provideing a first set of calibration data representing measured signal power obtained at a plurality of locations in a geographical area;
detecting at least one of an increase and a decrease in the amount of data traffic within a coverage area of at least one base station in the wireless network;
adding or subtracting at least one traffic channel to accommodate the change in data traffic;
providing a second set of data representing predicted signal power, said second set of data based on the change in data traffic;
comparing the first set of calibration data to the second set of data;
determining at least one function to represent at least one difference between the actual measured signal power and the predicted signal power; and
modifying one or more values of the first set of calibration data based on the at least one function and using the modified first set of calibration data to locate a mobile station, wherein the calibration data representing the plurality of different locations of the geographical area are represented as a data vector containing a plurality of different power level values of a plurality of different neighboring cell stations, where at least one value of said data vector is a dummy value used to represent one of said plurality of neighboring cells, and where the dummy value is incremented to represent a change in power level of the corresponding neighboring cell represented by said dummy value.

10. The method of claim 9, wherein the change in the number of traffic channels includes changing a frequency allocation of the base station.

11. The method of claim 9, further comprising:
comparing the signal power level of a serving base station to the power signal level of the modified at least one neighboring base station, and if the modified neighboring base station has a higher signal power level at a particular location point than the signal power level of the serving base station at that same location point, then changing the status of the neighboring base station by designating the neighboring base station as a new serving base station and designating the previously recognized serving base station as a neighboring base station.

12. The method of claim 11, wherein a timing advance parameter associated with the location of the new serving base station is modified in the first set of calibration data.

13. A method of modifying wireless network calibration data, the method comprising:
determining a power level change in signals received by one or more base stations communicating within a predefined region;
identifying at least a portion of the predefined region that may be affected by the power level change;
examining a collection of calibration data parameters to determine which data parameters represent location points within the portion of the predefined region affected by the power level change; and
modifying the data parameters within the portion of the predefined region affected by the power level change based on the value of the power level change, wherein the calibration data parameters are represented in one or more data vectors each containing a plurality of different power level values of a respective plurality of base stations, where each data vector corresponds to an individual location point in the predefined region, and at least one value of one of said data vectors is a dummy value used to represent one of said plurality of base stations, and where the dummy value is changed to represent a positive change in the power level of the corresponding base station represented by said dummy value.

14. The method of claim 13, wherein the portion of the predefined region represents a sector of one base station's coverage area.

15. The method of claim 13, wherein the portion of the predefined region represents all sectors of one base station's coverage area.

16. The method of claim 13, wherein the calibration data parameters are represented in one or more data vectors each containing a plurality of different power level values of a respective plurality of base stations within communication range of the wireless network, each data vector corresponds to an individual location point in the predefined region and at least two data vectors represent a sub-portion of the predefined region denoted as a grid region, and where an area represented by the grid region is updated autonomously such that the at least two data vectors are modified automatically due to the power level change.

17. The method of claim 13, wherein the calibration data parameters are represented in one or more data vectors each containing a plurality of different power level values of a respective plurality of base stations within communication range of the wireless network, each data vector corresponds to an individual location point in the predefined region and at least two data vectors represent a sub-portion of the predefined region denoted as a grid region, and where at least one parameter of the sub-portion that is affected by the power level change is omitted from a subsequent location effort.

* * * * *